United States Patent [19]
Goldman et al.

[11] Patent Number: 5,501,160
[45] Date of Patent: Mar. 26, 1996

[54] METHOD OF AND MEANS FOR GENERATING COMBUSTIBLE GASES FROM LOW GRADE FUEL

[75] Inventors: Daniel Goldman, Raanana, Israel; Boris Siniakevith, Lwow, Ukraine; Benjamin Doron, Jerusalem, Israel; Lucien Y. Bronicki, Yavne, Israel; Eli Yaffe, Savyon, Israel

[73] Assignee: Ormat Industries Ltd, Yavne, Israel

[21] Appl. No.: 274,575

[22] Filed: Jul. 13, 1994

Related U.S. Application Data

[63] Continuation of Ser. No. 34,887, Mar. 19, 1993, abandoned.

[30] Foreign Application Priority Data

Mar. 25, 1992 [IL] Israel ......................................... 101361
Mar. 30, 1992 [IL] Israel ......................................... 101424

[51] Int. Cl.$^6$ ........................................................ F23G 5/12
[52] U.S. Cl. ........................... 110/229; 110/233; 110/346; 48/101; 48/210
[58] Field of Search ........................... 110/229, 233, 110/234, 346, 347; 48/101, 210

[56] References Cited

U.S. PATENT DOCUMENTS

| | | | |
|---|---|---|---|
| 4,110,064 | 8/1978 | Vorona et al. | 431/171 |
| 4,211,606 | 7/1980 | Ponomarev et al. | 201/12 |
| 4,326,471 | 4/1982 | Rohrbach et al. | 110/341 |
| 4,432,290 | 2/1984 | Ishii et al. | 110/346 |
| 4,700,639 | 10/1987 | Esterson et al. | 110/347 |
| 4,760,650 | 8/1988 | Theliander et al. | 110/234 X |
| 4,917,024 | 4/1990 | Marten et al. | 110/233 |
| 5,236,470 | 8/1993 | Levin | 110/346 X |
| 5,388,534 | 2/1995 | Doron et al. | 110/233 |

*Primary Examiner*—Henry A. Bennett
*Assistant Examiner*—Susanne C. Tinker
*Attorney, Agent, or Firm*—Donald M. Sandler

[57] ABSTRACT

A portion of solid fuel is pyrolyzed in a pyrolyzer to produce combustible gases and carbonaceous material, the carbonaceous material being supplied from the pyrolyzer to a furnace. A further portion of the solid fuel is added to a furnace and is combusted with the carbonaceous material therein to produce combustion products that include hot flue gases and ash particulate. The combustion products are separated into a plurality of streams, one of which contains coarse ash and another of which contains flue gases and fine ash. A portion of the coarse ash is directed into the pyrolyzer while a further portion is disposed of, preferably by being used to heat air entering the furnace.

25 Claims, 7 Drawing Sheets

METHOD OF AND MEANS FOR GENERATING COMBUSTIBLE GASES FROM LOW GRADE FUEL

This application is a continuation of application Ser. No. 08/034,887, filed Mar. 19, 1993, now abandoned.

TECHNICAL FIELD

This invention relates to a method of and means for producing combustible gases from low grade solid fuel such as oil shale and the like.

BACKGROUND OF THE INVENTION

Oil shale is found throughout the world and would constitute a plentiful and relatively inexpensive fuel if techniques were available for quickly and inexpensively processing the oil shale into combustible gases. One approach to processing oil shale into combustible gases is disclosed in U.S. Pat. No. 4,211,606 (the disclosure which is hereby incorporated by reference). In this patent, oil shale is heated in a dryer using clean, hot flue gases producing heated shale that is applied to a pyrolyzer. The heated shale is further heated in the pyrolyzer with hot ash to produce combustible products, and carbonaceous material that is added to a gasifier. Hot gases and steam are applied to the gasifier such that combustible gases are produced. The residue of the gasifier is extracted and applied to what the patent terms an air jet furnace, details of which are disclosed in U.S. Pat. No. 4,110,064 which is also incorporated by reference.

The air jet furnace produces combustion products in the form of hot flue gases whose major constituents are nitrogen, carbon dioxide and particulate which is applied to a separator which separates the combustion products into a stream of hot coarse ash a portion of which is supplied to the pyrolyzer and portion of which is disposed of, and a stream of hot gas containing fine ash. The stream of hot gas and fine ash is applied to a separator that produces a stream of fine ash that is applied to the gasifier, and a stream of gases containing residual ash. The latter stream is applied to a further separator that produces the clean flue gases that serve to heat the shale in the dryer.

A less complex derivative of the apparatus described above has apparently been used in two plants in the U.S.S.R. in 1990 and 1991. As presently understood, the actual design eliminates the gasifier and the dryer. Oil shale is fed into a pyrolyzer wherein pyrolyzation takes place producing carbonaceous material after a predetermined residence time of the shale in the pyrolyzer. This material is supplied to an air jet furnace wherein combustion takes place producing hot flue gases, and particulate that is applied to a separator which separates the flow into a stream of coarse ash, and a stream of hot flue gases containing fine ash, such as fly ash. The stream containing the hot coarse ash is applied to the pyrolyzer which produces pyrolysis gas at a temperature in excess of 400° C. Such gas contains combustible products, steam and carbon compounds. The stream containing the combustible products from the pyrolyzer is applied, together with the stream of hot flue gases containing fine ash to a burner that is part of a combustion chamber of a boiler that produces steam that may be used for generating electricity.

The problem with a power plant utilizing this technique for burning oil shale is a reduction in thermal efficiency and available power caused by fouling of the heat transfer, surfaces in the steam boiler caused by the entry of fly ash into the boiler, and by carbonate decomposition which results in increased energy consumption and increased carbon dioxide emission from the power plant. Such high carbonate decomposition is caused since the air jet furnace must operate at high temperatures to obtain process stability. Such stability is achieved when the temperature at the output of the furnace is high enough so that the coarse ash added to the pyrolyzer has sufficient heat to heat the oil shale in the pyrolyzer as well as to evaporate water and organic matter associated with the shale. Concerning the amount of ash entering the the burner and consequently the steam boiler, it has been estimated that more than two-thirds of the amount of fly ash entering the boiler is derived from the fine ash carried with the hot gases from the air jet furnace, and less than about one-third is derived from the combustible gases produced by the pyrolyzer.

Reducing the temperature of the furnace will reduce the amount of carbonate decomposed therein and improve carbon dioxide emission from the power plant, but such reduction in temperature is achieved at the cost of reduced stability and of increased circulation rate through the furnace which has the detrimental effect of increasing the parasitic losses of the power plant and consequent reaction in the overall efficiency of the plant. In addition to this, the usual problem of fouling of the heat exchange surfaces is still present requiring periodic mechanical cleaning with high pressure liquid to remove soft deposits, and complete shut down and manual scraping to remove hard deposits.

It is therefore an object of the present invention to provide a new and improved method of and means for producing combustible gases from low grade solid fuel which substantially overcomes or significantly reduces the disadvantages outlined above.

BRIEF DESCRIPTION OF THE INVENTION

According to the present invention, a portion of the solid fuel is pyrolyzed in a pyrolyzer to produce combustible gases and carbonaceous material, the carbonaceous material being supplied from the pyrolyzer to a furnace. A further portion of the solid fuel is added to the furnace and is combusted with the carbonaceous material therein to produce combustion products that include hot flue gases and ash particulate. The combustion products are separated into a plurality of streams, one of which contains coarse ash and another of which contains flue gases and fine ash. A portion of the coarse ash is directed into the pyrolyzer while a further portion is disposed of, preferably by being used to heat air entering the furnace.

By supplying solid fuel to the furnace as well as to the pyrolyzer, in accordance with the present invention, flexibility of operation is achieved such that a wide selection of solid fuels having differing calorific values can be used by the same system. This can be achieved by the method and means provided in the present invention since the amounts of fuel supplied to the pyrolyzer as well as to the furnace can be modulated. In such a manner, sufficient heat can be produced in the furnace even when, for example, fuels having low calorific values are used. This is because, in accordance with the present invention, a portion of the solid fuel is furnished directly to the furnace rather than being supplied to the pyrolyzer prior to being supplied to the furnace as is common practice in conventional systems such as the system disclosed in U.S. Pat. No. 4,211,606. Furthermore, the operation of pyrolyzer can maintained at its optimum operating conditions irrespective of the quality of the solid fuel used without necessitating an increase of the rate at which ash is added to the pyrolyzer. Such an increase would bring about a reduction in the overall efficiency of the system since it would necessitate an increase in the flow rate of air flowing into the furnace and a consequent increase in the power consumption of the fan used to supply air to the furnace. According to the present invention, usually a greater portion of the fuel will be supplied to the furnace with less fuel being supplied to the pyrolyzer when a low quality fuel is used (i.e., fuel having a relatively small quantity of organic matter). On the other hand, a smaller portion of the fuel will be supplied to the furnace with more fuel being supplied to the pyrolyzer when a higher quality fuel is used.

The present invention also provides a method of and means for improving raw phosphates by eliminating substantially all organic matter wherein the need for use of external heat sources is minimized by utilizing the heat content of the organic matter itself. Moreover, the excess heat is put to a useful purpose such as for drying the raw phosphates and the production of power. Here, according to the present invention, pyrolysis is first carried out on portion of the raw phosphates for converting organic matter contained in the phosphates into combustible gases while a further portion of raw phosphates is supplied to a furnace. The products of combustion exiting the furnace comprise hot flue gases and improved phosphates which are applied to a separator. The latter separates the coarse phosphates into at least a stream which is fed to the pyrolyzer and a further stream of coarse phosphates which is extracted as the improved coarse phosphate product. Preferably, heat contained in the improved coarse phosphate product is used to heat air entering the furnace.

BRIEF DESCRIPTION OF THE DRAWINGS

Embodiments of the present invention are shown by way of example in the accompanying drawings wherein.

DETAILED DESCRIPTION

Figure 1:
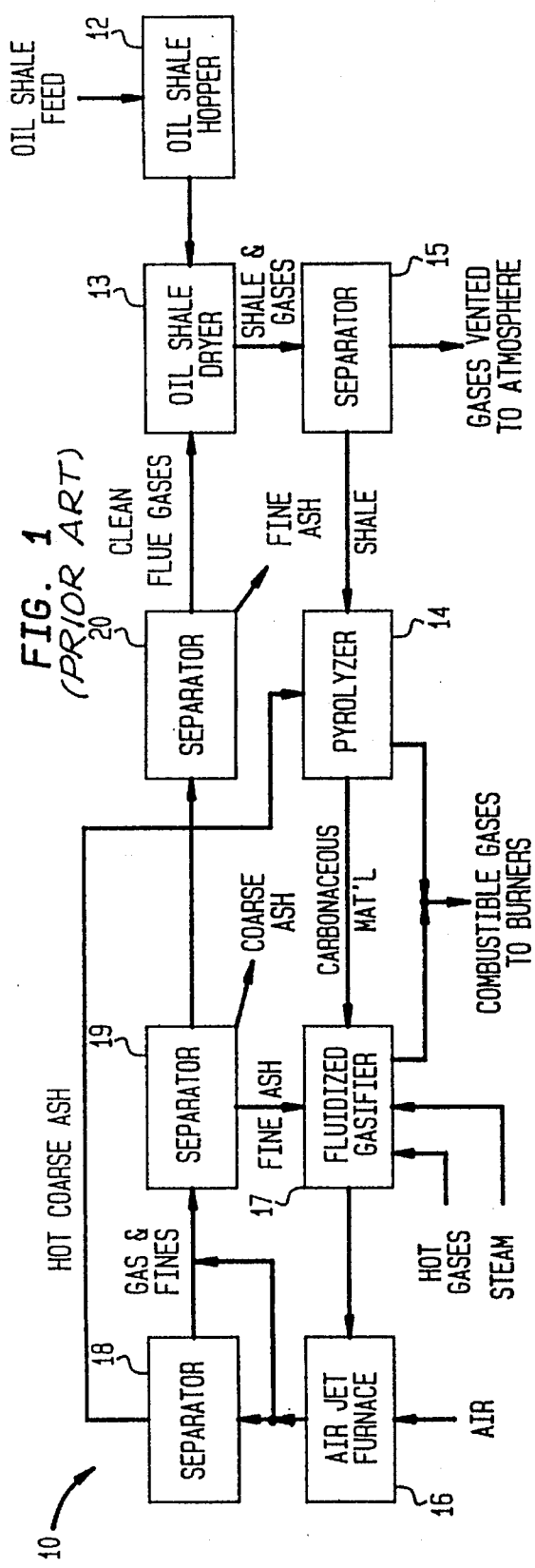
FIG. 1 is a block diagram which represents, in a schematic way, existing power plants for producing combustible gases from low grade solid fuel such as oil shale.

Referring now to FIG. 1, reference numeral 10 designates conventional apparatus for producing combustible products and gases from a low grade solid fuel such as oil shale. Ground oil shale is usually applied to oil shale hopper 12 having a screw feed device (not shown) for supplying shale from hopper 12 to dryer 13 that is supplied with clean flue gas that heats and dries the shale producing steam and other gases. The output of the dryer is applied to separator 15 which separates solids of the oil shale from the gases and applies the solids to pyrolyzer 14, the gases being vented to atmosphere. Pyrolysis takes place in pyrolyzer 14 under the influence of hot combustion products in the form of hot coarse ash applied to the pyrolyzer. In response, the pyrolyzer produces pyrolysis gases in the form of steam and combustible gases in excess of 400° C.

The carbonaceous material formed in pyrolyzer 14 is fed by a screw conveyer (not shown) to fluidize gasifier 17 which also receives hot combustion products in the form of fine ash. The contents of the gasifier are fluidized by the application of hot gases and steam; and the resultant product is supplied to air jet furnace 16 wherein combustion of the carbonaceous material takes place in the presence of ambient air supplied to the furnace. The outputs of the furnace are products of combustion comprising flue gases and particulate material which are applied to separator 18. The latter is effective to divide the flow into at least two streams, one of which contains hot coarse ash and another of which contains hot flue gases and hot fine ash.

The first stream containing the hot coarse ash is applied to the pyrolyzer and supplies the heat by which the pyrolysis takes place. The other stream containing the hot fine ash is applied to separator 19 to separate most of the fine ash which is applied to the gasifier, and producing relatively clean gases that are applied to separator 20 which is effective to remove residual ash and produce clean hot gases that are applied to dryer 13. A burner ( not shown) receives combustion gases from gasifier 17 and pyrolyzer 14, and combustion of these gases takes place in the combustion chamber of a boiler which produces steam used to generate electricity. The flue gates produced by the combustion chamber in the boiler are applied to a fine ash separator and the clean flue gases that exit the separator are applied to a stack.

Figure 2:
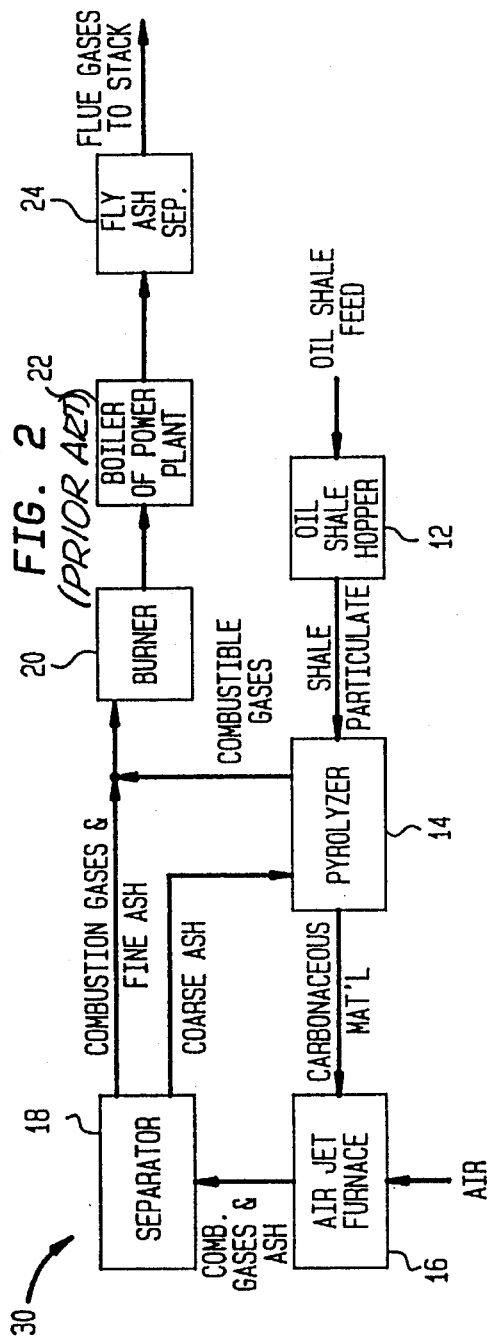
FIG. 2 is a block diagram of a modification of the apparatus shown in FIG. 1.

In the apparatus indicated by reference 30 in FIG. 2, the dryer and gasifier have been eliminated to simplify the construction and operation of the equipment.

Figure 3:
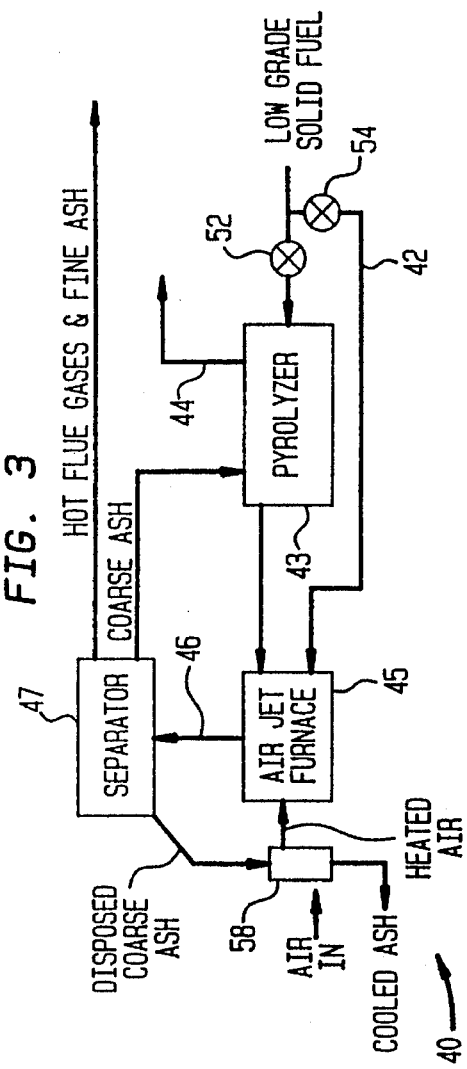
FIG. 3 is a block diagram of an embodiment of the present invention.

In the embodiment shown in FIG. 3 as apparatus 40, low grade solid fuel such as oil shale is supplied to both pyrolyzer 43 and air jet furnace 45. In pyrolyzer 43, the fuel is heated substantially in the absence of oxygen to produce combustible gases which exit through conduit 44, and carbonaceous material which is supplied to air jet furnace 45 where the carbonaceous material and fuel supplied to the furnace 45 via conduit 42 is combusted with air. The products of combustion exit the furnace through conduit 46, such products comprising hot flue gases and ash particulates which are applied to separator 47. The latter separates the coarse ash, part of which is fed to pyrolyzer 43 and part of which is disposed of in an ash removal system. Preferably, heat contained in the removed ash is used to heat air entering air furnace 45 in heat exchanger 58. Hot flue gases and fine ash is contained in a further stream exiting the separator.

By supplying solid fuel to the furnace as well as to the pyrolyzer, flexibility of operation is achieved such that a wide selection of solid fuels having differing calorific values can be used. This is achieved by using feed regulators 52 and 54, connected to conduit 42, to change the respective feeding rate of fuel to the pyrolyzer as well as to the furnace.

Thus, sufficient heat can be produced in the furnace even when, for example, fuels having low calorific values are used. This is because, in accordance with the present invention, a portion of the solid fuel is furnished directly to the furnace rather than being supplied to the pyrolyzer prior to being supplied to the furnace as is common practice in conventional systems. According to the present invention, usually a greater portion of the fuel will be supplied to the furnace with less of the fuel being supplied to the pyrolyzer when a low quality fuel is used (i.e., fuel having a relatively small quantity of organic matter). On the other hand, a smaller portion of the fuel will be supplied to the furnace with more of the fuel being supplied to the pyrolyzer when a higher quality fuel is used. Thus, according to the present invention, apparatus 40 produces combustible gases from a broad range of solid low grade fuels.

Figure 4:
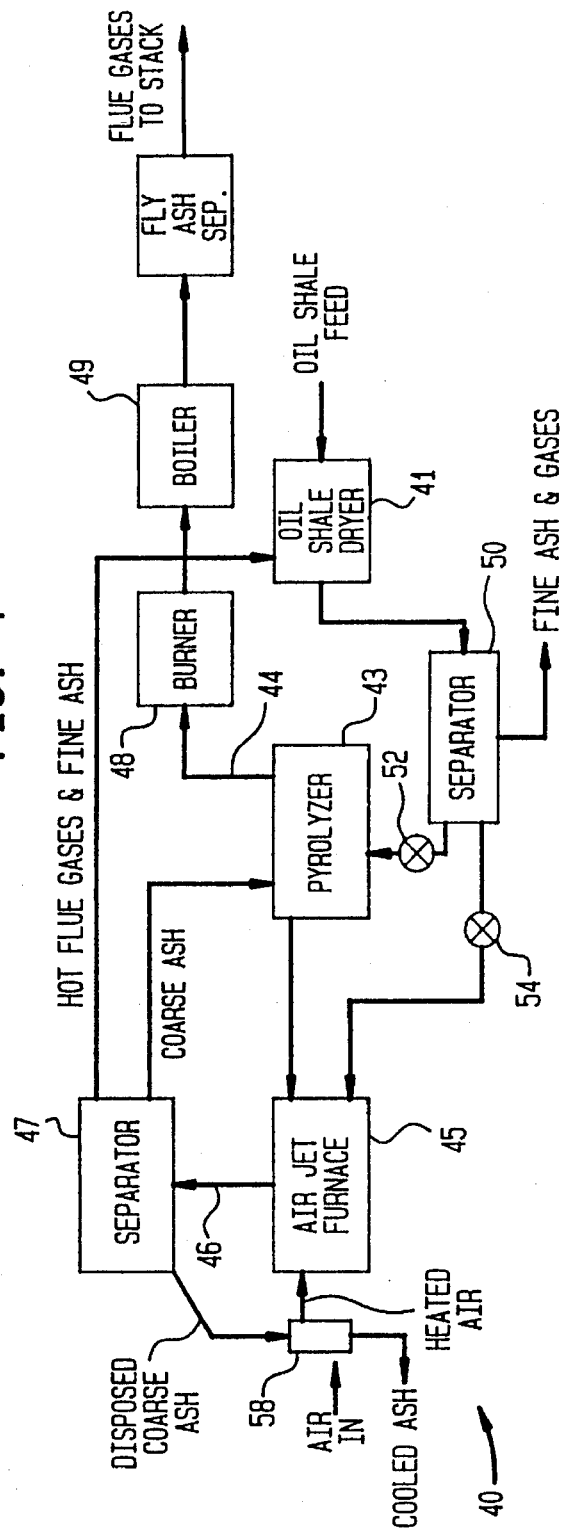
FIG. 4 is a block diagram of another embodiment of the invention.

Turning to the embodiment shown schematically in FIG. 4, the present invention is shown in a system using burner 48 and boiler 49 suitable for the operation of a power plant which employs steam generated by boiler 49. In the apparatus shown in FIG. 4, oil shale is fed into dryer 41 usually from a hopper (not shown) wherein the shale is dried by reason of the application to the dryer of the hot flue gases containing hot fine ash. After these gases and hot ash give up their heat to the shale, water in the shale is vaporized and is separated together with the cooled gases and cooled fine ash by separator 50 from the heated and dried shale.

A portion of the heated and dried shale from separator 50 is conveyed to pyrolyzer 43, where the fuel is heated substantially in the absence of oxygen to produce combustible gases which exit through conduit 44, and carbonaceous material which is supplied to air jet furnace 45. In air jet furnace 45, the carbonaceous material and fuel supplied to furnace 45 via conduit 42 is combusted with air. The products of combustion exit the furnace through conduit 46, such products comprising hot flue gases and ash particulates which are applied to separator 47. The latter separates the coarse ash from the flue gases, part of the ash being fed to pyrolyzer 43 and part being disposed of in an ash removal system. Preferably, the ash disposed is used to heat air supplied to air jet furnace 45 in heat exchanger 58.

The combustible gases that exit the pyrolyzer through conduit 44 are essentially clear of ash; and as a consequence, these gases burn cleanly in burner 48. Little ash build-up occurs in the combustion chamber and heat exchange surfaces of boiler 49. Because of this, the efficiency of the boiler is not adversely affected, and down time for cleaning fouled heat exchange surfaces is reduced.

Because the shale that enters pyrolyzer reactor 43 is already heated and dried in the dryer, less heat has to be supplied by the coarse ash from separator 47. Consequently, the furnace can be operated at a lower temperature which reduces carbon dioxide emission from the power plant utilizing the invention.

Figure 5:
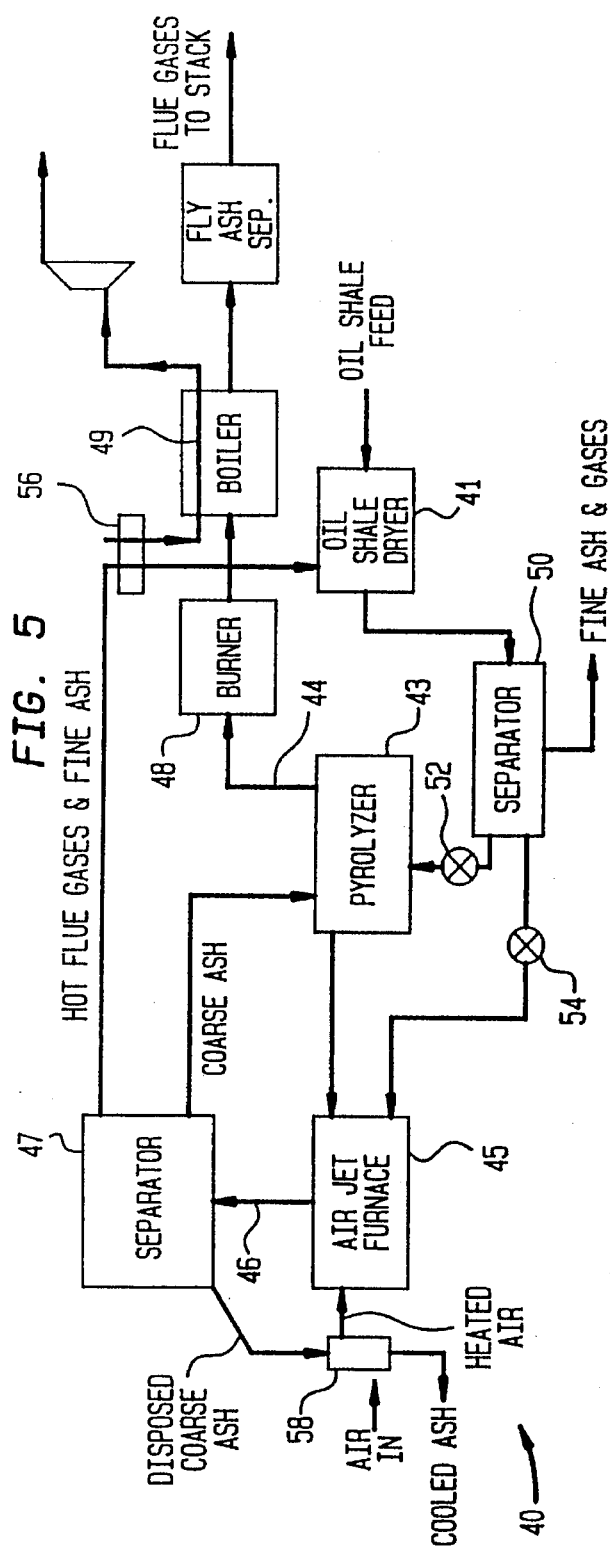
FIG. 5 is a block diagram of a modification of the embodiment of FIG. 4.

In the embodiment shown in FIG. 5, presently considered to be the best mode of the present invention, a system similar to that shown and described in relation to FIG. 4 is shown. However, in this embodiment, heat exchanger, 56 is employed for heating water vaporized in boiler 49 with heat contained in hot flue gases and fine ash exiting separator 47. As shown in the apparatus disclosed in FIG. 5, the steam produced in boiler 49 can be used to operate a power plant such as that including a steam turbine. Although heat exchanger 56 extracts heat contained in the flue gases and ash exiting separator 47, sufficient heat is left in the flue gases and ash to carry out the drying of the oil shale in drier 41.

Even though heat exchanger 56 has hot flue gases and fine ash flowing though it, relatively little ash, build up occurs on its heat exchange surfaces since heat transfer occurs in this heat exchanger in the absence of combustion. Consequently, the amount of material contained in the flue gases which is melted and/or fused is substantially reduced since the temperature of the flue gases and ash flowing in this heat exchanger can be maintained at a relatively low temperature of about 700° C. Furthermore, since the water temperature will usually be less than 200° C., the temperature of the wall of the heat transfer surfaces will consequently be close to such a temperature reducing the probability of fusing.

Figure 6:
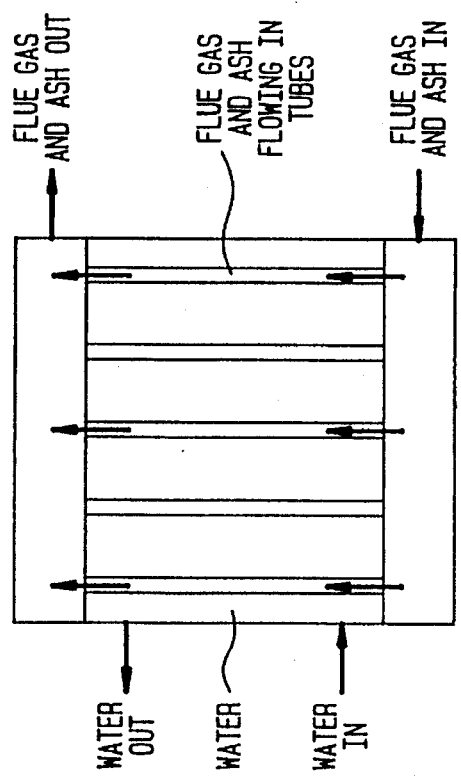
FIG. 6 is a schematic diagram of a heat exchanger for use in the embodiment shown in FIG. 5.

Heat exchanger 56 as shown in FIG. 6 can take the form of a vertical shell and tube heat exchanger with the flue gases and ash flowing in the tubes and the water being present in the shell side of the heat exchanger.

Basically, the embodiment shown in FIG. 5 operates in the same manner as the embodiment described in relation to FIG. 4. Thus, also in this embodiment less heat has to be supplied to the coarse ash from separator 47 to pyrolyzer 43. Therefore, the furnace can be operated at a lower temperature if preferred such that carbon dioxide emissions from a power plant using the invention can be reduced. Even so, the furnace temperature can be adjusted so that sufficient carbonate will be decomposed to produce CaO which normally with the remaining carbonate will ensure the capture of sulfur compounds during pyrolysis and during combustion in the furnace. Such capture is also efficient in the combustion chamber of boiler 49 due to the temperature therein and is optimal for such reactions e.g., $CaCO+(½)O_2+SO_2 \rightarrow CaSO_4$ and/or $CaCO_3+(½)O_2+SO_2 \rightarrow CaSO_4+CO_2$ to take place. Furthermore, if preferred, the particulate reaching the combustion chamber from pyrolyzer 43 can be used for facilitating the absorption of oxides of sulfur and/or other sulfur compounds originating from the combustion of other fuels in the combustion chamber which are rich in sulfur.

While the invention is described in connection with utilizing low grade fuel such as oil shale, the invention is applicable to other types of low grade fuel such as peat. Furthermore, while this specification refers to oil shale or other low grade solid fuel as material for use in the pyrolyzer, it should be understood that the oil shale or other low grade fuel may be mixed with or introduces into the pyrolyzer together with another fuel, such as residual oil that is rich in sulfur. In such case, particulate from the pyrolyzer can be used to efficiently capture oxides of sulfur and/or other compounds during combustion of the pyrolysis gases. The other fuels rich in sulfur previously mentioned may be solid, liquid, or gaseous. However, when the fuel is mixed or introduced into the pyrolyzer together with the oil shale, only solid or liquid fuel would be appropriate.

In addition to the fuels mentioned above, other fuels may also be used. For example, refuse derived fuel (RDF) can be used as well as unsegregated refuse such as municipal solid waste.

The present invention also provides a method of and means for improving raw phosphates (i.e., phosphates found in many places in the world containing more than about 1–1.5% by weight of organic material) by eliminating substantially all organic material. According to the invention, apparatus disclosed in the present application, or apparatus disclosed in U.S. Pat. No. 4,211,606 can be used. Alternatively, apparatus disclosed in U.S. Pat. No. 4,700,639, the disclosure of which is hereby incorporated by reference, can be used. At present, the best mode of the present invention for improving raw phosphates, is apparatus disclosed in the present application, wherein a pyrolyzer converts organic matter contained in the phosphates into gas.

Conventional methods of raw phosphate improvement can handle phosphates containing up to only 1 to 1.5% by weight of organic matter. Improved results can be obtained by baking the phosphates at a temperature of approximately 900° C. so that most of organic matter is consumed. Such baking, however, will not be sufficient to deal with phosphates having a higher organic matter content.

Figure 7:
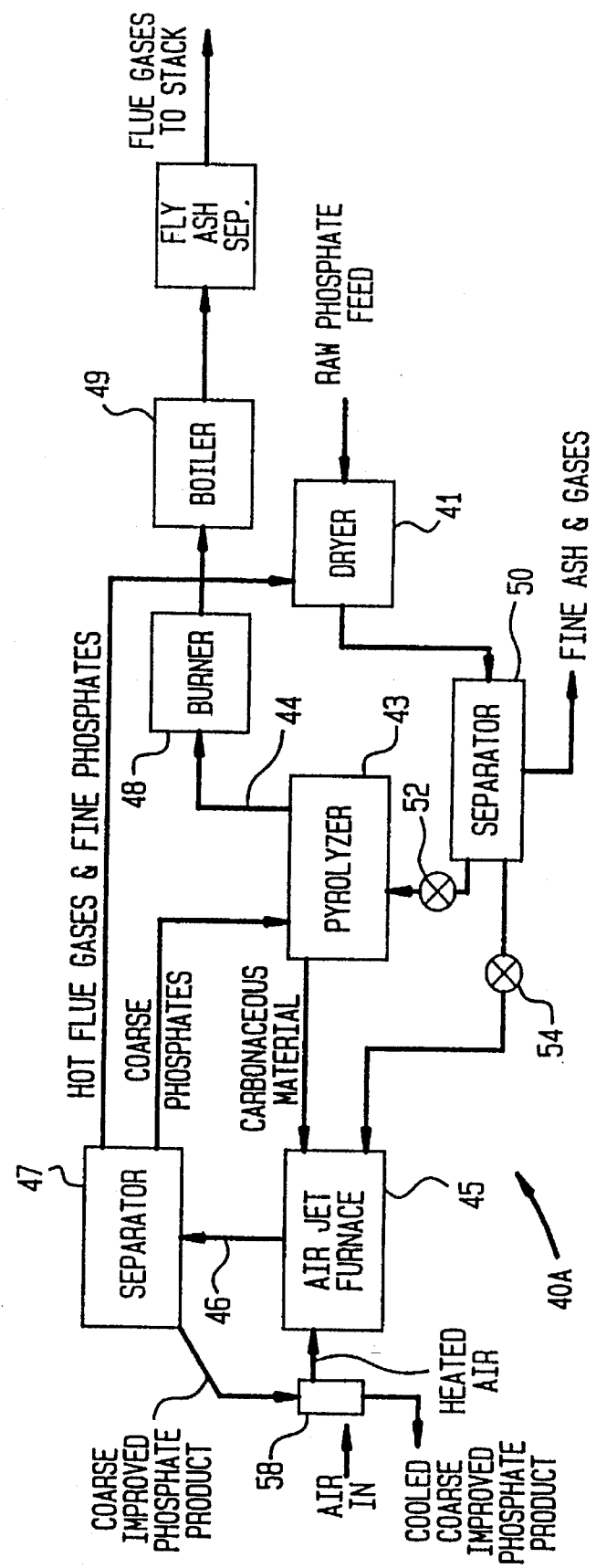
FIG. 7 is a block diagram of another embodiment of the invention in which organic matter in phosphates is removed to produce improved phosphates.
Figure 8:
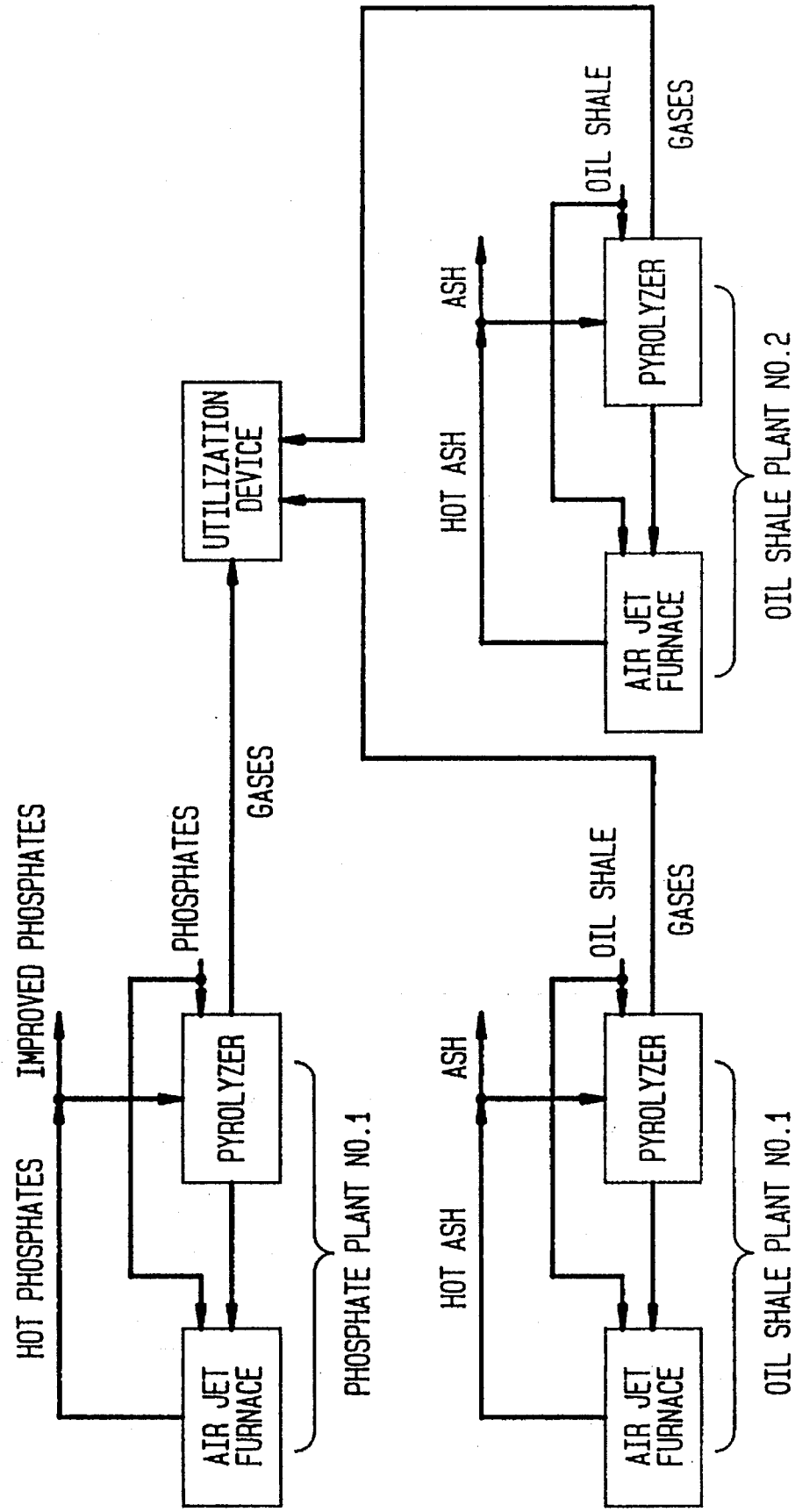
FIG. 8 is a block diagram of a modification of the embodiment of FIG. 7.
Figure 9:
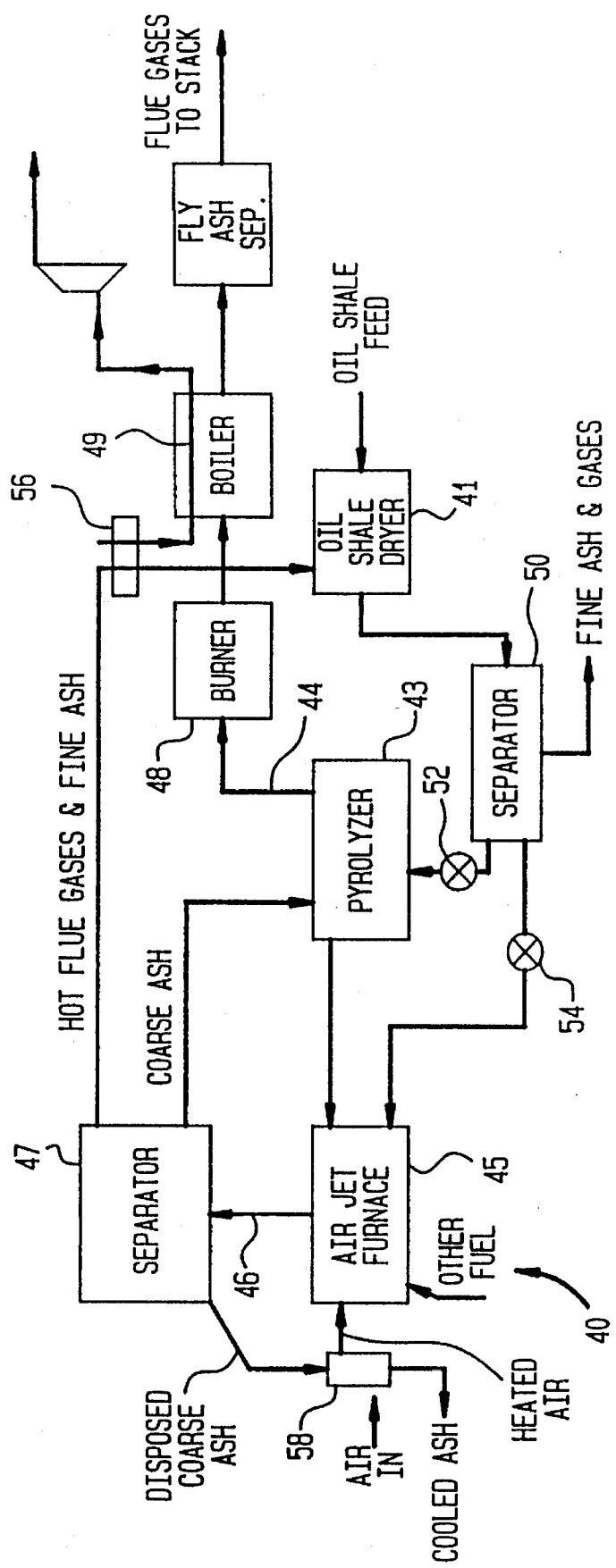
FIG. 9 is a block diagram of an embodiment of the invention.
Figure 10:
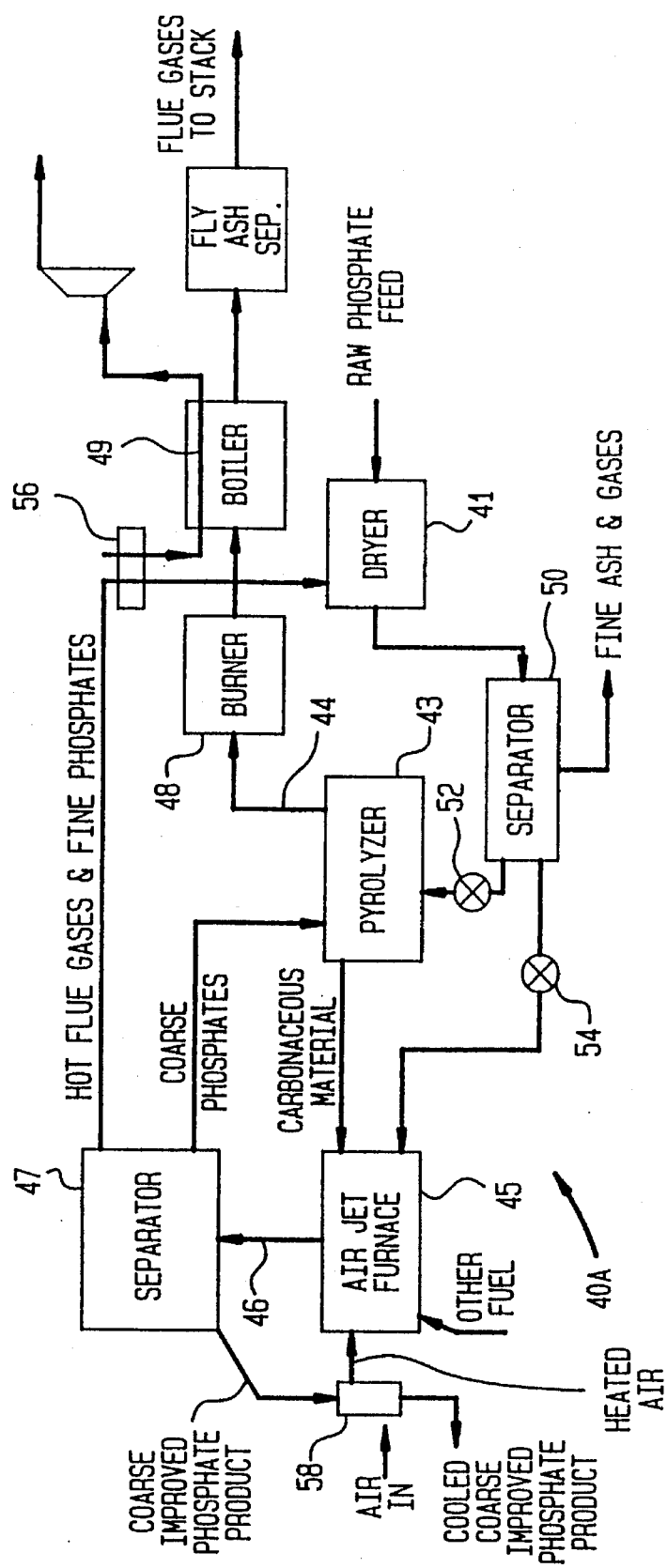
FIG. 10 is a block diagram of an embodiment of the invention in which organic matter in phosphates is removed to produce improved phosphates.

The preferred method for improving raw phosphates having higher organic content, according to the present invention, is to utilize at least a two-stage process of (1) pyrolysis, and (2) baking. According to the present invention, pyrolysis is first carried out on portion of the raw phosphates for converting organic matter contained in the phosphates into combustible gases which are extracted from the pyrolyzer and made available for combustion as shown in the apparatus disclosed in FIGS. 7 and 8 while a further portion of raw phosphates is supplied to air jet furnace 45. Alternatively, the combustible gases can be furnished to a utilization device other than the combustion chamber of a power plant. In pyrolyzer 43, the phosphates are heated substantially in the absence of oxygen to produce combustible gases which exit through conduit 44, and carbonaceous material which is supplied to air jet furnace 45 where the carbonaceous material and the raw phosphates supplied to the furnace 45 via conduit 42 are combusted with air. The products of combustion exit the furnace through conduit 46, such products comprising hot flue gases and improved phosphates which are applied to separator 47. The latter separates the coarse phosphates into a stream which is fed to pyrolyzer 43, a further stream of coarse phosphates which is extracted as the improved coarse phosphate product while an additional stream contains hot flue gases and fine phosphates. Preferably, heat contained in the improved coarse phosphate product is used to heat air entering air furnace 45 in heat exchanger 58. As shown in FIG. 7, the hot flue gases and fine phosphates can be used for drying the phosphates before they are supplied to the pyrolyzer and air jet furnace.

Also in this embodiment, flexibility of operation is achieved such that a wide selection of phosphates having differing calorific values can be used by supplying the phosphates to the furnace as well as to the pyrolyzer. This is achieved by using feed regulators 52 and 54, connected to conduit 42, to change the respective feeding rate of phosphates to the pyrolyzer as well as to the furnace. Thus, sufficient heat can be produced in the furnace even when for example phosphates having low calorific values are used. According to the present invention, usually a greater portion of the phosphates will be supplied to furnace and less of the phosphates will be supplied to the pyrolyzer when a phosphate having a low organic matter content is used (i.e., a phosphate having a relatively small quantity of organic matter). On the other hand, a smaller portion of the phosphates will be supplied to furnace and more of the phosphates will be supplied to the pyrolyzer when a higher quality phosphate is used. Thus, according to the present invention, combustible gases are produced for a broad range of phosphates.

Phosphates remaining in the pyrolyzer after pyrolyzing is effected are removed and baked in an air jet furnace which, preferably, is operated at a relatively high speed and a relatively high temperature, about 900° C., such that any organic material remaining in the phosphates is combusted and/or any other processes requiring such a high temperature in the improvement process of the raw phosphates may take place. Consequently, the phosphates exiting the air jet furnace will contain only a relatively small amount of organic matter and are thus improved.

Thus a portion of the improved phosphates exiting the air furnace is extracted as the product of the process, while a further portion is applied to the pyrolyzer for heating phosphates therein during the pyrolysis process. In other words, a portion of the particulate improved phosphates exiting the air furnace is supplied to the pyrolyzer in a manner similar to that in which the ash exiting the air furnace is supplied to the pyrolyzer in the previous embodiments of the present invention, or in the manner in which the apparatus disclosed in U.S. Pat. No. 4,211,606 provides heat for the pyrolysis process.

FIG. 7 shows the present invention used for producing improved phosphates and combustible gases that are used in a utilization device, which may be the combustion chamber of a power plant. Other uses for the combustible gases may include burning the gases in the combustion chamber of a gas turbine, or internal combustion engine such as a diesel engine that may drive a generator and produce power, or utilizing the gases as raw material in a chemical production line.

If the amount of organic matter in the phosphates reaching the air jet furnace from the pyrolyzer is insufficient for permitting the air jet furnace to operate at the high temperature required, coal or any other fuel can be added to the air jet furnace to ensure that the required high temperatures are achieved in the air furnace. Alternatively, a portion of the gases exiting the pyrolyzer can be added to the air jet furnace for ensuring that the required high temperatures are reached.

In a further embodiment of the present invention, a plurality of plants can be used for providing gases for a utilization device such as the combustion chamber of a power plant, or for other uses described above. When the gases are used to provide fuel for a power plant, one or a number of oil shale processing plants, analogous to the ones specified in the above described embodiment of the present invention or that described in U.S. Pat. No. 4,211,606 or in U.S. Pat. No. 4,700,639, can be used in conjunction with one or a number of raw phosphate processing plants described above as shown schematically in FIG. 8. In such a manner, raw phosphates, usually having a varying calorific value can be processed such that combustible gases exiting the raw phosphate processing plants, can be supplied to a combustion chamber for combustion to which gases exiting oil shale processing plants, usually having a reasonably fixed calorific value are also supplied. If preferred, the gases produced by the phosphate processing plants and the gases produced by the oil shale processing plants can be supplied to separate combustion chambers.

Alternatively, if some of the raw phosphates have a reasonably fixed calorific value, these phosphates can also be processed in a separate plant or plants, with the phosphates having a varying calorific value being processed in other processing plants. Gases produced from these processing plants can be supplied to a common combustion chamber, or to separate combustion chambers if preferred.

Furthermore, where the raw phosphates and oil shale are extracted from the same or adjacent layers (shale layers are often above or below phosphate layers), a single conveyer 14 may be used for conveying the oil shale and/or phosphates to the appropriate processing plants. In such a way, separate conveyer systems are eliminated.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. A method for producing combustible gases from solid fuel comprising the steps of:
   a) pyrolyzing a portion of said fuel in a pyrolyzer to produce said combustible gases and carbonaceous material;
   b) supplying said carbonaceous material from said pyrolyzer to a furnace and adding to said furnace a further portion of said solid fuel for combusting the carbonaceous material and said further portion of solid fuel to produce combustion products that include hot flue gases and ash particulate;
   c) separating ash from said combustion products; and
   d) directing separated ash into said pyrolyzer.

2. A method according to claim 1 further comprising the step of adding another fuel to said furnace for combustion.

3. A method according to claim 2 wherein the step of adding another fuel to said furnace for combustion is carried out by using a high sulfur content fuel such that sulfur compounds produced during combustion in said furnace are captured.

4. A method according to claim 1 further comprising the step of drying said solid fuel before it is pyrolyzed, and before it is added to said furnace.

5. A method according to claim 4 wherein the step drying the fuel is carried out by applying said combustion products to said solid fuel.

6. A method according to claim 5 further comprising the step of separating fine ash and gases from the dried solid fuel.

7. A method according to claim 6 wherein the step of supplying said portion of solid fuel to the pyrolyzer is carried out by supplying to the pyrolyzer a portion of said dried solid fuel after fine ash and gases have been separated therefrom.

8. A method according to claim 7 wherein the step of adding said further portion of solid fuel to said furnace is carried out by adding to the furnace a further portion of said dried solid fuel after fine ash and gases have been separated therefrom.

9. A method according to claim 1 further comprising the step of using said combustible gases for producing power.

10. A method according to claim 9 wherein said step producing power is carried out by supplying said combustible gases to a combustion chamber of a boiler for combustion and production of steam from water, said steam driving a steam turbine coupled to an electric generator for producing electric power.

11. A method according to claim 10 further comprising the step of combusting another fuel in said combustion chamber, said fuel being a high sulfur content fuel such that sulfur compounds produced during combustion in said combustion chamber are captured.

12. A method according to claim 9 further comprising the step of heating said water supplied to the boiler of the power plant before the water flows into said boiler with said combustion products.

13. Apparatus for producing combustible gases from solid fuel comprising:
   a) a pyrolyzer for pyrolyzing a portion of said fuel to produce said combustible gases and carbonaceous material;
   b) supply means for supplying said carbonaceous material from said pyrolyzer to a furnace and adding to said furnace a further portion of said solid fuel for combusting the carbonaceous material and said further portion of solid fuel to produce combustion products that include hot flue gases and ash particulate;
   c) a separator for separating ash from said combustion products; and
   d) supply means for directing separated ash into said pyrolyzer.

14. A method for improving raw phosphates containing organic matter comprising the steps of:
   a) pyrolyzing a portion of the phosphates in a pyrolyzer to produce combustible gases and carbonaceous material;
   b) supplying said carbonaceous material from said pyrolyzer to a furnace and adding to said furnace a further portion of said phosphates for combusting the carbonaceous material and said further portion of the phosphates to produce combustion products that include hot flue gases and improved phosphates;
   c) separating said combustion products into a plurality of streams, one of which contains coarse phosphates, the another of which contains improved coarse phosphate products which are extracted; and
   d) directing coarse phosphates from said one stream into said pyrolyzer.

15. Apparatus for improving raw phosphates containing organic matter comprising:
   a) a pyrolyzer for pyrolyzing a portion of the phosphates to produce combustible gases and carbonaceous material;
   b) supply means for supplying said carbonaceous material from said pyrolyzer to a furnace and adding to said furnace a further portion of said phosphates for combusting the carbonaceous material and said further portion of the phosphates to produce combustion products that include hot flue gases and improved phosphates;
   c) a separator for separating said combustion products into a plurality of streams, one of which contains coarse phosphates, the another of which contains improved coarse phosphate products which are extracted; and
   d) directing coarse phosphates from said one stream into said pyrolyzer.

16. A method for producing combustible gases from solid fuel comprising the steps of:
   a) pyrolyzing a portion of said fuel in a pyrolyzer to produce said combustible gases and carbonaceous material;
   b) supplying said carbonaceous material from said pyrolyzer to a furnace, and adding to said furnace another fuel which combusts with the carbonaceous material to produce combustion products that include hot flue gases and ash particulate;
   c) separating said combustion products into a plurality of streams, one of which contains coarse ash and the another of which contains flue gases and fine ash; and
   d) directing ash from a stream into said pyrolyzer.

17. A method according to claim 16 wherein the fuel added to said furnace is a high sulfur content fuel such that sulfur compounds produced during combustion in said furnace are captured.

18. A method according to claim 1 wherein separating ash from said combustion products includes separating said combustion products into a plurality of streams, one of which contains coarse ash, and another of which contains flue gases and finer ash.

19. A method according to claim 18 wherein directing separated ash into said pyrolyzer is effected by directing said stream containing coarse ash into said pyrolyzer.

20. A method according to claim 18 including drying said solid fuel before it is pyrolyzed, and before it is added to said furnace.

21. A method according to claim 20 wherein drying said solid fuel is effected by directing at least a portion of the stream containing flue gases and finer ash into said solid fuel.

22. A method according to claim 12 wherein heating said water is effected by said flue gases.

23. Apparatus according to claim 13 wherein said separator is constructed and arranged to separate said combustion products into a plurality of streams, one of which contains coarse ash, and another of which contains flue gases and finer ash.

24. Apparatus according to claim 23 wherein said supply means is constructed and arranged to direct said stream containing coarse ash into said pyrolyzer.

25. A method according to claim 16 wherein directing ash form a stream is effected by directing said stream containing coarse ash into said pyrolyzer.

* * * * *